(12) United States Patent
Ohba et al.

(10) Patent No.: US 8,600,233 B2
(45) Date of Patent: Dec. 3, 2013

(54) ARBITRATION OF OPTICAL COMMUNICATION BUS

(75) Inventors: Nobuyuki Ohba, Sendai (JP); Atsuya Okazaki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/309,599

(22) Filed: Dec. 2, 2011

(65) Prior Publication Data

US 2012/0141118 A1  Jun. 7, 2012

(30) Foreign Application Priority Data

Dec. 7, 2010  (JP) ................................. 2010-272709

(51) Int. Cl.
- *H04J 14/00* (2006.01)
- *H04B 17/00* (2006.01)
- *H04B 10/00* (2013.01)
- *H04B 10/278* (2013.01)

(52) U.S. Cl.
CPC .................................. *H04B 10/278* (2013.01)
USPC .................................. 398/60; 398/9; 398/154

(58) Field of Classification Search
USPC ...................... 398/45, 9, 58, 66–72, 154, 155
See application file for complete search history.

(56) References Cited

U.S. PATENT DOCUMENTS

| 5,726,976 A * | 3/1998 | Thompson et al. ........... 370/229 |
| 6,031,821 A | 2/2000 | Kalkunte et al. |
| 6,122,667 A | 9/2000 | Chung |
| 7,936,765 B2 * | 5/2011 | Kim et al. ................. 370/395.41 |
| 2003/0147654 A1 | 8/2003 | Sung et al. |
| 2006/0140639 A1 | 6/2006 | Effenberger |
| 2009/0232151 A1 | 9/2009 | Furlong et al. |
| 2009/0290872 A1 * | 11/2009 | Xu et al. ......................... 398/45 |

OTHER PUBLICATIONS

Chae, Chang-Joon et al., "Optical CSMA/CD Media Access Scheme for Ethernet Over Passive Optical Network." IEEE Photonics Technology Letters, vol. 14, No. 5, pp. 711-713, May 2002.

Mason, Lorne et al., "Topological design and dimensioning of Agile All-Photonic Networks," Computer Networks 50, pp. 266-287. 2006.

* cited by examiner

*Primary Examiner* — Dalzid Singh
(74) *Attorney, Agent, or Firm* — Jon A. Gibbons; Fleit Gibbons Gutman Bongini & Bianco PL

(57) ABSTRACT

A method, bus controller, and computer program product for arbitrating use of a communication bus for a certain one of a plurality of interconnected nodes that share the bus. The method includes the steps of: presenting a data frame on the transmitter and receiver side of the bus, where the certain node presents at the transmitter side, where the data frame has a embedded clock of a predetermined timing and a header field, synchronizing, by the certain node, with the embedded clock in the data frame at the receiving side of the bus, successively presenting, by the certain node, an idle pattern on the bus determined by a preassigned node ID, emitting light, by the certain node, on the bus at a predetermined timing preassigned to the certain node, and monitoring light emission on the bus that indicates a bus access request from another one of the nodes.

13 Claims, 7 Drawing Sheets

Passive Optical Network (PON)

State Machine of Frame Controller

ARBITRATION OF OPTICAL COMMUNICATION BUS

This application claims priority under 35 U.S.C. §119 from Japanese Patent Application No. 2010-272709 field Dec. 7, 2010, the entire contents of which are incorporated herein by reference.

BACKGROUND OF THE INVENTION

1. Field of the Invention

The present invention relates to arbitration of an access to an optical communication bus and use thereof. More particularly, the present invention relates to arbitration of access for one of a plurality of optically interconnected nodes that share the communication bus.

2. Related Art

FIG. 1(a) is a diagram showing an exemplary configuration of an optical communication bus for which a number of blade servers are optically interconnected (number of nodes).

Commonly owned, unpublished Japanese Patent Application No. 2010-149373 (Attorney Docket No. JP920100021JP1) describes an optical communication bus for a backplane of blade servers. Such an optical communication bus is depicted in FIG. 1(a) above.

In the above application, the communication distance between any pair of blade servers to be inserted arbitrarily into a backplane, for example, up to six blade servers, is set equal.

As schematically shown in FIG. 1(b), the portion of the communication bus is shared among the optically interconnected blade servers (nodes). Specifically, accesses to (or use of) the communication bus are shared in a portion indicated by M. This configuration is called a star topology because of its radial branching as seen in L0 to Ln or N0 to Nn.

As schematically shown in FIG. 1(b), three communication paths, i.e., a communication path L0-M-N0, a communication path L1-M-N1, and a communication path L2-M-N2 are all set to have an equal distance. Schematically modified from the view FIG. 1(c) to FIG. 1(d), the communication paths are formed as a fiber sheet or an optical waveguide in the backplane.

Between blade servers (nodes) with an equal communication distance that are set in the above manner, a Wave Division Multiplex (WDM) technique using a number of wavelengths is used for selecting a data source and a data destination. However, it is known that WDM devices are expensive.

An alternative to WDM is a Time Division Multiplex (TDM) technique, which transmits data in a time division manner while using the same wavelength.

FIG. 2 is a diagram showing a Passive Optical Network (PON) as a conventional technique using a TDM optical link.

In a PON, a timing at which each node can transmit data is preassigned to the node as a timeslot. For a number of subscriber optical network units (ONUs) to use a central optical line terminal (OLT), time division is used with a guard time secured.

However, for a blade server, an approach of contending for the use of a bus by request from each blade is desirable from the viewpoint of Bandwidth on Demand.

In an optical backplane, clock timing is embedded in data. Therefore, a receiver side performs Clock Data Recovery (CDR). For effective use of the bus, a CDR device on the receiver side needs to enter a lock state and retrieve the clock as soon as possible after the start of transmission.

While the lock time depends on various parameters such as the CDR type, how the input data changes, and how the frequency shifts, the lock time is typically about several tens to several hundreds of nano seconds.

Generally, an optical link for one-to-one or one-to-many connection always maintains the lock state by sending an idle signal even when no data is being transmitted. However, this technique cannot be used for an optical bus because there are several light-emitting sources and they should not arbitrarily transmit idle data.

FIG. 3(a) is a schematic diagram showing a waveform with a DC balance kept.

FIG. 3(b) is schematic diagram showing a waveform with a DC balance lost.

SUMMARY OF THE INVENTION

One aspect of the invention includes a method for arbitrating use of a communication bus for a certain one of a plurality of optically interconnected nodes that share the communication bus. The method includes the steps of: presenting a data frame on the transmitter and receiver side of the bus, where the certain node performs the presenting on the transmitter side, where the data frame has a clock of a predetermined timing embedded therein, and where the data frame contains a header field, synchronizing with the clock embedded in the data frame being presented on the receiving side of the bus, where the certain node performs the synchronizing, presenting, successively, an idle pattern on the bus determined by a node ID preassigned to the certain node within a range of the synchronized data, where the certain node performs the successive presenting, emitting light on the bus at a predetermined timing preassigned to the certain node within a range of the header field, as a bus access request from the transmitter side, where the emitting is performed by the certain node, and monitoring light emission on the bus that indicates a bus access request from any other one of the plurality of nodes within the range of the header field, where the monitoring is performed by the certain node at the receiver side.

Another aspect of the invention includes a bus controller for arbitrating an access to a communication. The bus controller includes: a communication bus, a plurality of interconnected nodes connected to the communication bus, where a certain one of the plurality of optically interconnected nodes is configured to: synchronize a data frame presented on the transmitter side of the bus by the certain node, where the data frame has a clock of a predetermined timing embedded therein, and where the data frame contains a header field, generate an idle pattern to be successively presented on the bus within a range of the synchronized data frame, where the idle pattern is determined by a node ID preassigned to the certain node, emit light on the bus at a predetermined timing preassigned to the certain node within a range of the header field as a bus access request from the transmitter side, and monitor, at the receiver side of the bus, a light emission on the bus that indicates a bus access request from any other one of the plurality of nodes within the range of the header field.

Yet another aspect of the invention is a computer program product tangibly embodying computer readable non-transitory instructions which cause a computer to carry out the steps of a method for arbitrating an access to a communication bus for a certain one of a plurality of optically interconnected nodes that share the communication bus. The method includes the steps of: presenting a data frame on the transmitter and receiver side of the bus, where the certain node performs the presenting on the transmitter side, where the data frame has a clock of a predetermined timing embedded therein, and where the data frame contains a header field, synchronizing with the clock embedded in the data frame being presented on the receiving side of the bus, where the certain node performs the synchronizing, presenting, successively, an idle pattern on the bus determined by a node ID preassigned to the certain node within a range of the synchronized data, where the certain node performs the successive presenting, emitting light on the bus at a predetermined timing preassigned to the certain node within a range of the header field, as a bus access request from the transmitter side, where the emitting is performed by the certain node, and monitoring light emission on the bus that indicates a bus access request from any other one of the plurality of nodes within the range of the header field, where the monitoring is performed by the certain node at the receiver side.

DETAILED DESCRIPTION OF THE PREFERRED EMBODIMENTS

An object of the present invention consists in arbitrating an access to (or use of) a communication bus for a node without requiring expensive WDM devices.

Since an optical link is used with AC coupling, the DC balance needs to be kept. At the same time, for quick operation, stimulation must be regularly provided (signals must be input and output) in a certain period of time.

A signal is always sent on a bus, and each node synchronizes with the signal. This allows maintaining a CDR lock state.

A node desiring to use the bus emits light in a preassigned timeslot in a frame header being sent on the bus, thereby performing bus arbitration. Each node detects an idle signal slot. Upon detecting the idle signal slot, the node sends an idle pattern on the bus at a timing assigned to the node. All nodes send the idle pattern at least once during a preassigned period of time to keep a DC balance of an AC coupling device.

An access to (or use of) a communication bus for a node can be arbitrated without requiring expensive WDM devices.

Figure 1A:
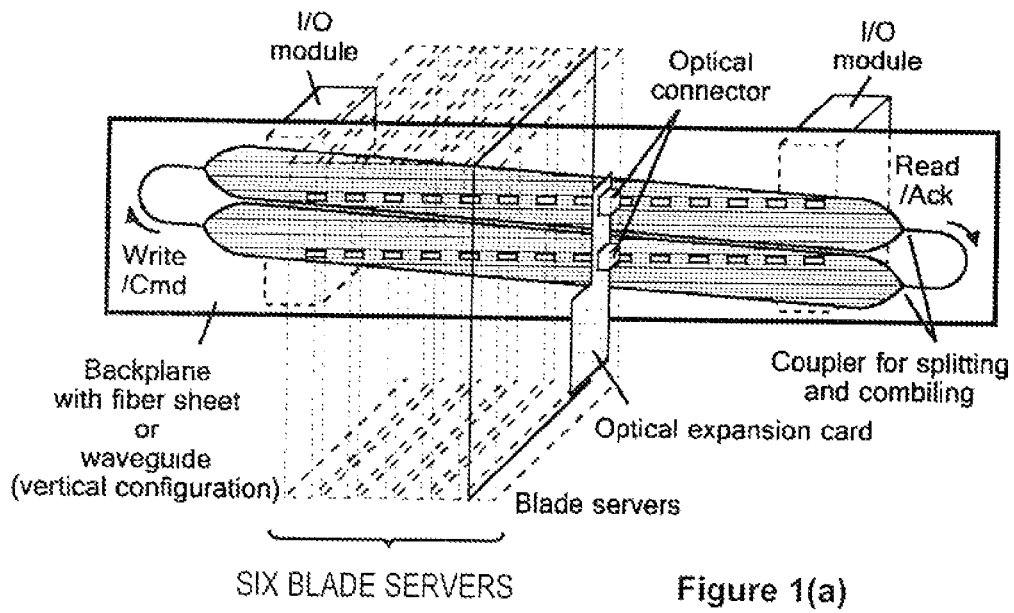
FIG. 1(a) is a diagram showing an exemplary configuration of an optical communication bus for which a number of blade servers are optically interconnected (nodes).
Figure 1B:
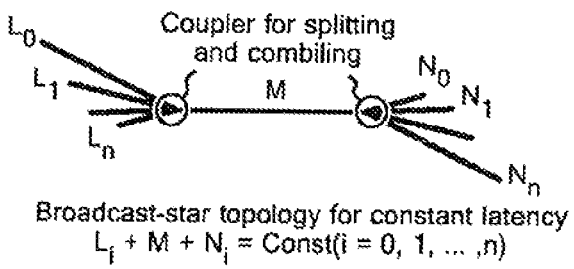
FIG. 1(b) is a diagram showing an exemplary configuration of an optical communication bus for which a number of blade servers are optically interconnected (nodes).
Figure 1C:
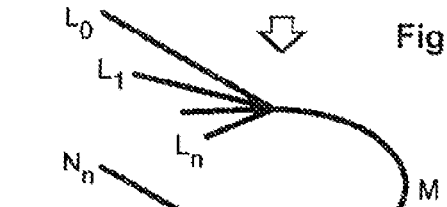
FIG. 1(c) is a diagram showing an exemplary configuration of an optical communication bus for which a number of blade servers are optically interconnected (nodes).
Figure 1D:
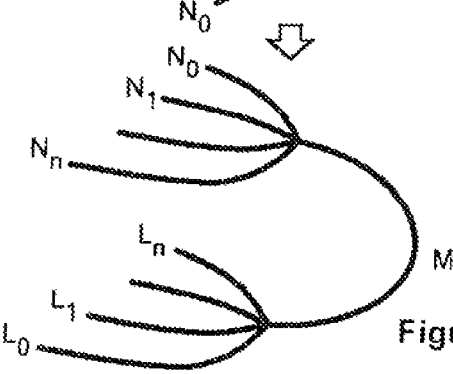
FIG. 1(d) is a diagram showing an exemplary configuration of an optical communication bus for which a number of blade servers are optically interconnected (nodes).
Figure 2:
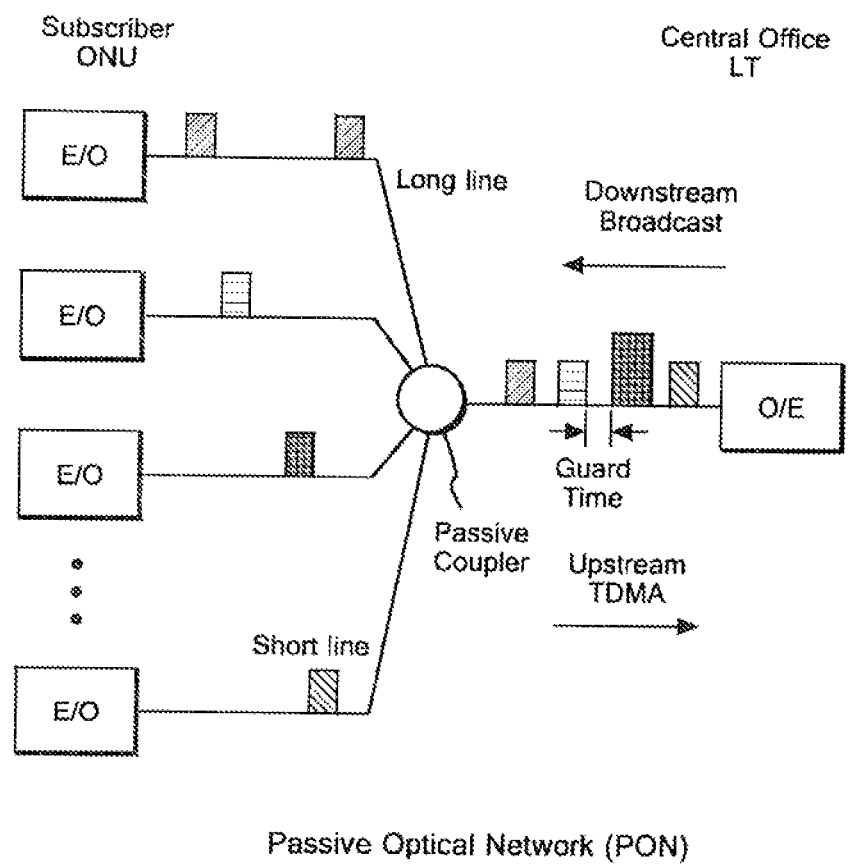
FIG. 2 is a diagram showing a Passive Optical Network (PON) as a conventional technique using a TDM optical link.
Figure 3A:
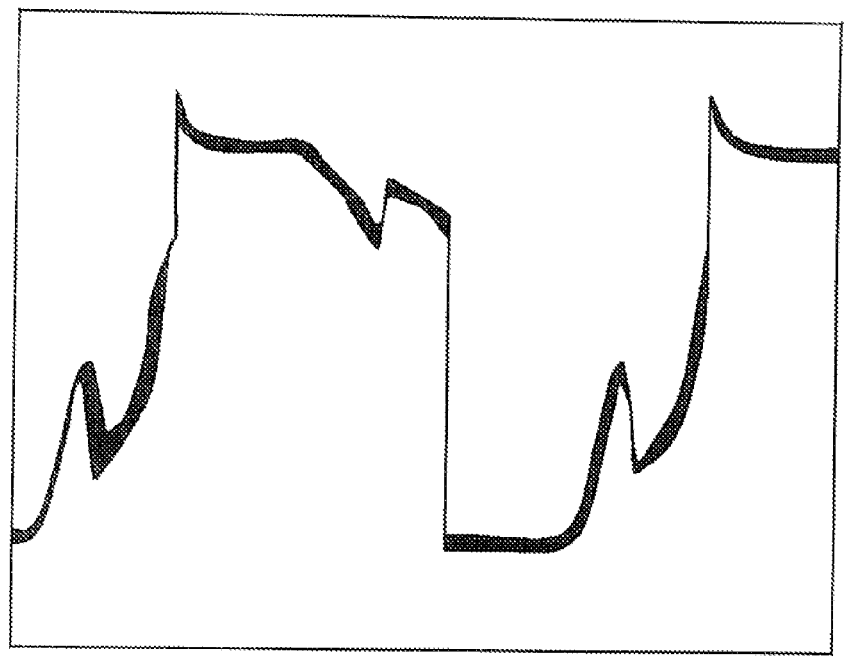
FIG. 3(a) is a schematic diagram showing a waveform with a DC balance kept.
Figure 3B:
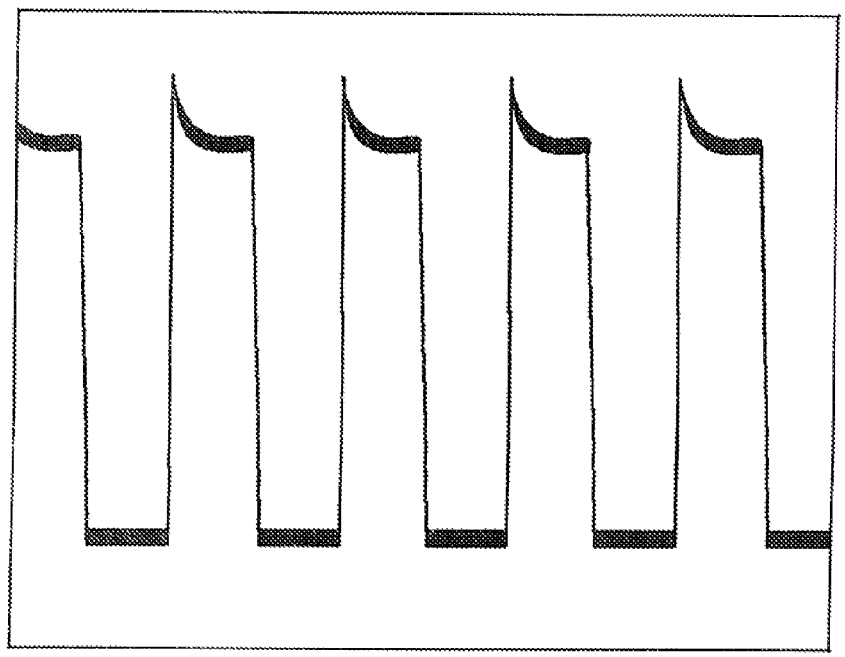
FIG. 3(b) is a schematic diagram showing a waveform with the DC balance lost.
Figure 4:
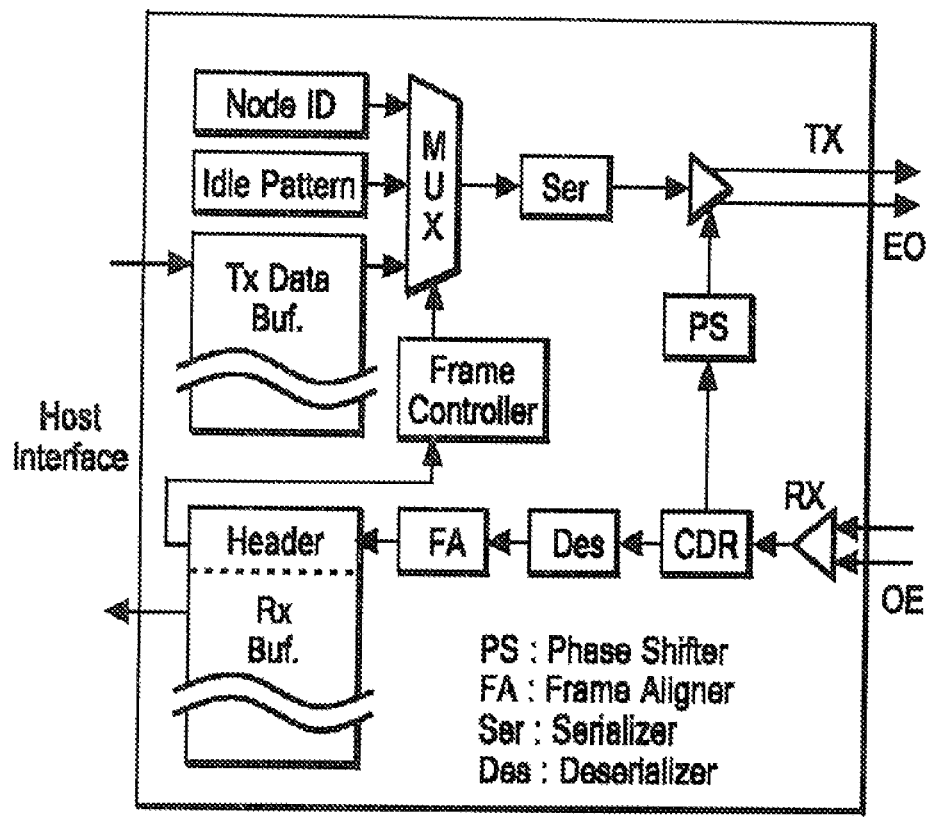
FIG. 4 is a diagram showing an exemplary configuration of a bus controller circuit in which the present invention is implemented.

FIG. 4 is a diagram showing an exemplary configuration of a bus controller circuit in which the present invention is implemented. FIG. 4 is associated with Table 1, which contains abbreviations, provided below:

TABLE 1

| NAME | Function |
| --- | --- |
| Node Id | ID PREASSIGNED TO EACH NODE |
| Idle Pattern | IDLE PATTERN GENERATOR |
| Tx Data Buf. | TRANSMISSION DATA BUFFER |
| MUX | MULTIPLEXER |
| Frame Controller | FRAME CONTROLLER, BUS REQUEST |
| Header | HEADER |
| Rx Buf. | RECEIVER BUFFER |
| Ser | SERIALIZER |
| PS | PHASE SHIFTER, ALIGN PHASES OF RECEIVED SIGNAL AND SIGNAL TO BE TRANSMITTED |
| FA | FRAME ALIGNER |
| Des | DESERIALIZER |
| CDR | CLOCK DATA RECOVERY, RETRIEVE CLOCK FROM RECEIVED DATA |
| EO | ELECTRICAL → OPTICAL CONVERTER |
| OE | OPTICAL → ELECTRICAL CONVERTER |

A node ID is preassigned, such as upon power-on, by a management module or the like provided in a backplane into which a number of nodes are inserted, according to the condition in which a number of blades are inserted into the backplane. Each inserted blade performs TX (transmission) and RX (receiving) to and from a communication bus via optical connectors (see FIGS. 1(a), 1(b), 1(c), and 1(d)).

Transmission data is input from a host interface to a transmitter data buffer (Tx Data Buf). A transmission data frame is generated by a frame controller, and transmitted through a bus arbitration mechanism described below in a timing slot for which a bus right has been granted.

In a timing slot in which an idle pattern described below needs to be issued, the frame controller retrieves an idle pattern (ip) from an idle pattern generator (Idle Pattern) and transmits the idle pattern.

The transmission data is transmitted with a clock embedded therein (Embedded Clocking). For the frequency and the phase of the transmission clock, a clock reproduced in a clock data recovery (CDR) in a receiver section is passed through a phase shifter and used as a reference clock. Thus, the transmission clock can be synchronized in all the nodes connected to the communication bus in the backplane (Japanese Patent Application No. 2010-149373 (filed on Jun. 30, 2010) (applicant serial No: JP920100021)), and the bandwidth can be efficiently used without the need of relocking of the CDR every time the transmission node is switched as in the case of a PON.

Received data is latched with the clock reproduced in the CDR and passed through a deserializer (Des), and then stored in a receiver buffer (Rx Buf). A header portion in a received data frame is also used by the frame controller such as for bus arbitration and idle pattern (ip) transmission control. A received data portion is output to the host interface.

The above bus controller can be configured as a system including these functions. The above bus controller can also be implemented as a method including steps for realizing these functions, or even as a computer program causing a computer to perform the steps.

Figure 5:
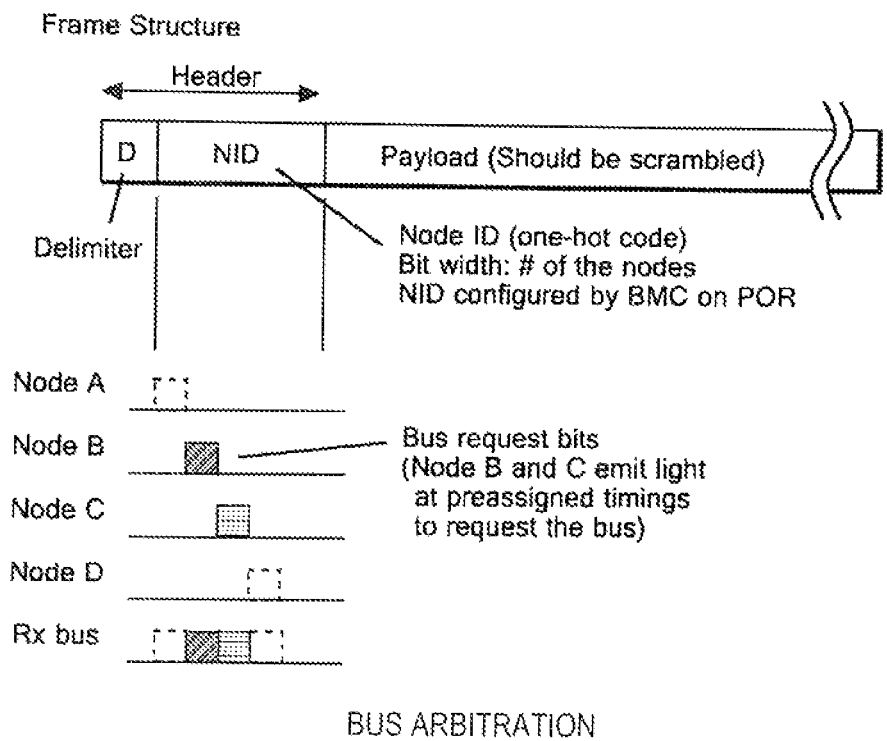
FIG. 5 is a diagram showing a structure of a communication data frame and the manner of using the communication data frame for bus arbitration among nodes according to the present invention.

FIG. 5 is a diagram showing a structure of a communication data frame and the manner of using the communication data frame for bus arbitration among nodes.

Each of nodes (a Node A, a Node B, a Node C, and a Node D) desiring to use a bus emits light at a certain timing preassigned to the node in the header. In this figure, the light is emitted by means of a request bit.

All the nodes monitor (the presence of) the request bit, so that each node can know the situation such that the slot is an idle slot (no nodes have issued a request), only the node has issued a request (the node can use the bus in the next slot), or another node as well as the node has issued a request (a collision is to be avoided with back-off). Accordingly, the node can determine an action to take next.

Since the essence of the above embodiment lies in the ability to distinguish the nodes from each other, those skilled in the art will be able to conceive various ways of issuing a request.

The portion called a payload can contain data to be transmitted. The data can be transmitted with its information content scrambled.

Figure 6:
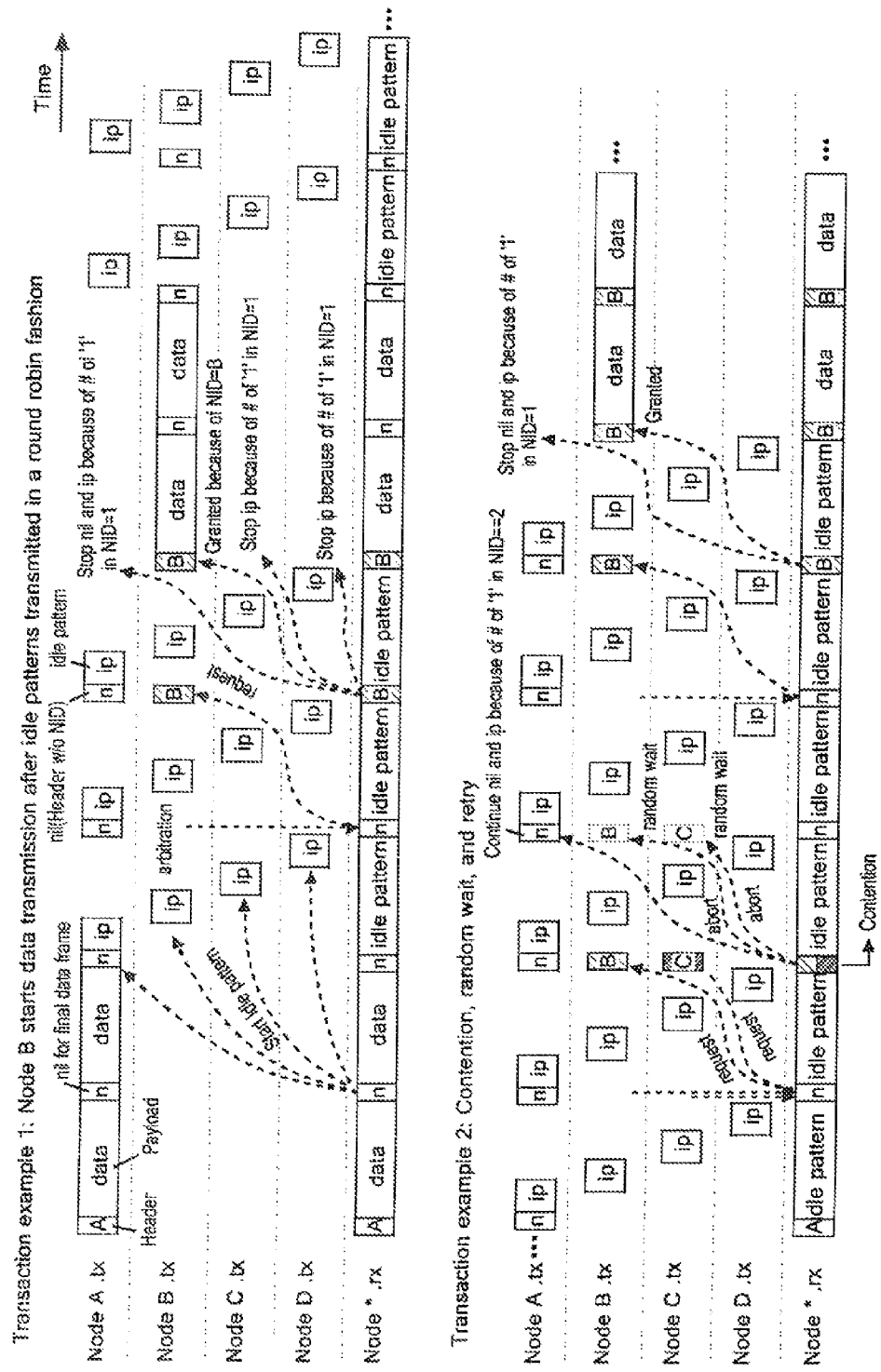
FIG. 6 is a diagram showing exemplary arbitration operations according to the present invention.

FIG. 6 is a diagram showing exemplary arbitration operations.

Transaction example 1 in the upper part of FIG. 6 is an example in which only the Node B requests the bus and the other nodes do not request the bus, so that the node B acquires an access/use right to the bus (i.e. access granted) and transmits/presents data on the bus in the next data frame.

Transaction example 2 in the lower part of FIG. 6 is an example in which contention occurs due to simultaneous requests for the bus made by the Node B and the Node C, which then perform back-off. In the back-off, the Node B and the Node C abort light emission. After random-duration waiting (Random Wait), the Node B again requests the bus and acquires the access/use right to the bus.

A bus slot in which no nodes have issued a request will be referred to as an idle slot. Each node monitors the header being sent on the bus and detects an idle slot.

By sending an idle pattern (ip) at a certain timing (determined from a Node ID) preassigned to the node, the node regularly stimulates the transmitter. Although the timing is assigned here in a round-robin manner, the idle pattern (ip) can only need to be presented "successively" in a broad sense, and those skilled in the art will be able to conceive various other manners.

When no nodes use the bus, the idle pattern (ip) is transmitted. When the bus is continuously used and the idle pattern inevitably cannot be issued within a limit, the bus is actively requested to issue the idle pattern.

Figure 7:
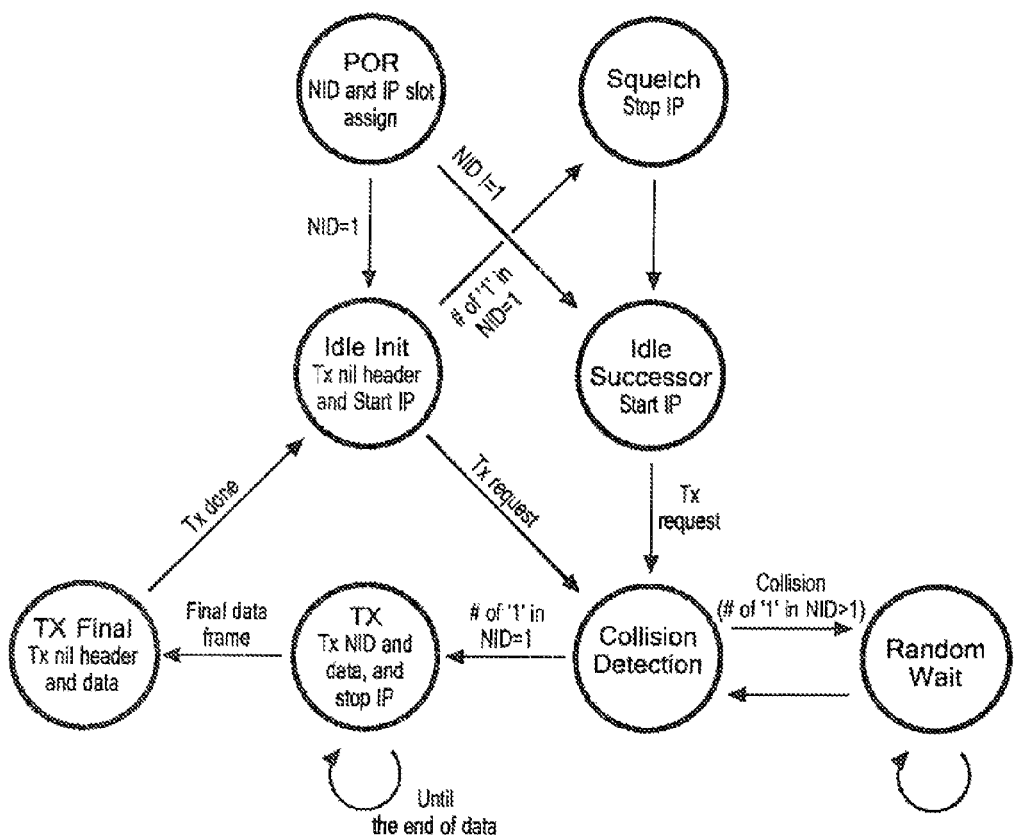
FIG. 7 is a state transition diagram of operations according to the present invention.

FIG. 7 is a state transition diagram of operations.

The state transition of operations is merely an example, and those skilled in the art will be able to conceive various other manners.

What is claimed is:

1. A method for arbitrating use of a communication bus on an optical backplane for a certain node of a plurality of optically interconnected nodes that share the communication bus, the method comprising the steps of:
presenting a data frame on a transmitter side and a receiver side of the bus, wherein the certain node performs the presenting on the transmitter side, wherein the data frame has a clock of a predetermined timing embedded therein, and wherein the data frame contains a header field;
synchronizing with the clock embedded in the data frame being presented on the receiving side of the bus, wherein the certain node performs the synchronizing;
presenting, successively, an idle pattern on the bus determined by a node ID preassigned to the certain node within a range of the synchronized data, wherein the certain node performs the successive presenting to maintain a DC balance of the bus;
emitting light on the bus at a predetermined timing preassigned to the certain node within a range of the header field, as a bus access request from the transmitter side, wherein the emitting is performed by the certain node; and
monitoring light emission on the bus that indicates a bus access request from any other one of the plurality of nodes within the range of the header field, wherein the monitoring is performed by the certain node at the receiver side.

2. The method according to claim 1, wherein the certain node further performs the step of presenting data in a next data frame, instead of the presenting the idle pattern at the transmitter side, if only the certain node is emitting light on the bus.

3. The method according to claim 1, wherein the certain node continues presenting the idle pattern, and wherein the certain node aborts the light emission on the bus if another node, as well as the certain node, is emitting light on the bus.

4. The method according to claim 1, wherein the idle pattern is preassigned in a round-robin manner among the plurality of nodes within the range of the synchronized data frame.

5. A bus controller for arbitrating an access to a communication bus on an optical backplane comprising:
a communication bus;
a plurality of interconnected nodes connected to the communication bus, wherein a certain node of the plurality of optically interconnected nodes is configured to:
synchronize a data frame presented on a transmitter side of the bus by the certain node, wherein the data frame has a clock of a predetermined timing embedded therein, and wherein the data frame contains a header field;
generate an idle pattern to be successively presented on the bus within a range of the synchronized data frame, wherein the idle pattern is determined by a node ID preassigned to the certain node;
emit light on the bus at a predetermined timing preassigned to the certain node within a range of the header field as a bus access request from the transmitter side; and
monitor, at a receiver side of the bus, a light emission on the bus that indicates a bus access request from any other one of the plurality of nodes within the range of the header field.

6. The bus controller according to claim 5, wherein the certain node is further configured to present data in a next data frame instead of presenting the idle pattern if only the certain node is emitting light on the bus.

7. The bus controller according to claim 6 further comprising a transmitter data buffer.

8. The bus controller according to claim 5, wherein the bus and all of the plurality of nodes are configured in a manner such that light emission at the transmitter side is aborted if another node, as well as the certain node, emit light on the bus.

9. The bus controller according to claim 5, wherein the idle pattern is preassigned in a round-robin manner among the plurality of nodes within the range of the synchronized data frame.

10. A computer program product tangibly embodying computer readable non-transitory instructions which cause a computer to carry out the steps of a method for arbitrating an access to a communication bus on an optical backplane for a certain node of a plurality of optically interconnected nodes that share the communication bus, wherein method comprises the steps of:
- presenting a data frame on a transmitter side and a receiver side of the bus, wherein the certain node performs the presenting on the transmitter side, wherein the data frame has a clock of a predetermined timing embedded therein, and wherein the data frame contains a header field;
- synchronizing with the clock embedded in the data frame being presented on the receiving side of the bus, wherein the certain node performs the synchronizing;
- presenting, successively, an idle pattern on the bus determined by a node ID preassigned to the certain node within a range of the synchronized data, wherein the certain node performs the successive presenting;
- emitting light on the bus at a predetermined timing preassigned to the certain node within a range of the header field, as a bus access request from the transmitter side, wherein the emitting is performed by the certain node; and
- monitoring light emission on the bus that indicates a bus access request from any other one of the plurality of nodes within the range of the header field, wherein the monitoring is performed by the certain node at the receiver side.

11. The computer program product according to claim 10, wherein the certain node further performs the step of presenting data in a next data frame, instead of the presenting the idle pattern at the transmitter side, if only the certain node is emitting light on the bus.

12. The computer program product according to claim 10, wherein the certain node continues presenting the idle pattern, and wherein the certain node aborts the light emission on the bus if another node, as well as the certain node, is emitting light on the bus.

13. The computer program product according to claim 10, wherein the idle pattern is preassigned in a round-robin manner among the plurality of nodes within the range of the synchronized data frame.

\* \* \* \* \*